United States Patent [19]

Osborn

[11] Patent Number: 4,850,933

[45] Date of Patent: Jul. 25, 1989

[54] FLEXIBLE COUPLING

[75] Inventor: Paul V. Osborn, Webster, N.Y.

[73] Assignee: Mobil Oil Corporation, New York, N.Y.

[21] Appl. No.: 99,278

[22] Filed: Sep. 21, 1987

[51] Int. Cl.[4] ............................ F16D 3/79; F16D 3/50
[52] U.S. Cl. ......................................... 464/81; 464/98; 464/100; 464/102; 464/147
[58] Field of Search ....................... 464/81, 84, 98, 99, 464/100, 101, 102, 147

[56] References Cited

U.S. PATENT DOCUMENTS

| | | | |
|---|---|---|---|
| 1,392,342 | 10/1921 | Laycock | 464/101 |
| 3,092,911 | 6/1963 | Lotzgesell | 464/100 X |
| 3,266,270 | 8/1966 | Yutkowitz | 464/99 |
| 3,611,750 | 10/1971 | Gasior | 464/84 |
| 3,934,487 | 1/1976 | Becker | 464/84 X |
| 3,987,645 | 10/1976 | Koster et al. | 464/98 |
| 4,033,144 | 7/1977 | Allen | 464/84 X |

FOREIGN PATENT DOCUMENTS

| | | | |
|---|---|---|---|
| 82797 | 6/1983 | European Pat. Off. | 464/99 |
| 853804 | 3/1940 | France | 464/101 |

OTHER PUBLICATIONS

Formsprag (Div. of Morse), Flexible Disc Couplings (Cat E-1002, p. 16.
Waldon Div. Midland Ross Flexible Couplings Bull DL-2500 R, 1963 copyright, p. 3.
Allen Couplings, Inc. Deltaflex, 1985, six page flyer.

Primary Examiner—Daniel P. Stodola
Attorney, Agent, or Firm—Alexander J. McKillop; Charles J. Speciale

[57] ABSTRACT

A flexible coupling of the light weight, low inertia spring plate type having a central disk which through flex provides for angular misalignment and four supporting side leaf springs which provide for parallel misalignment. Bolted on exterior drive lugs transmit the torque to the central disk. Bronze guides provide for attachment of the leaf springs to the center disk. The drive and driven plates are connected to hubs which are split so they can be clamped onto the input and output shafts which are subject to alternating torque loads.

6 Claims, 3 Drawing Sheets

FLEXIBLE COUPLING

FIELD OF THE INVENTION

This invention relates to a high speed, high torque flexible coupling and particularly to a light weight, low inertia spring plate type flexible coupling for coupling a drive shaft with a driven shaft.

BACKGROUND OF THE INVENTION

In certain applications it is necessary to deliver a high torque as the rotational speed of the drive shaft goes from zero to a maximum RPM and back to zero during many cycles per minute. By way of example, in a system for the manufacture of plastic film bags such as garbage bags, trash bags and the like, it is necessary to precisely position the plastic bags delivered from a bag machine to an exact position on a vacuum table for transfer to a bag folder. Examples of such a bag making system are disclosed in my related applications Ser. No. 099,276 Hydraulic Index Drive System Ser. No. 099,275 Plastic Film Air Table Conveyor and Ser. No. 099,277 Flexible Material Folding Apparatus concurrently filed herewith and assigned to the assignee of this application. In a bag making system of the type disclosed therein, the criteria for the coupling between the hydraulic index drive and the driven roll on the vacuum table is in the order of plus and minus 500 inch lbs. of torque as the rotational speed goes from zero to 1200 RPM and back to zero 120 times per minute.

The usual type of couplings are not satisfactory as there is too much torsional flexibility and they add too much inertia to the system. A bellows type coupling having zero backlash was found to be too large and have too much inertia. In a prior disk type coupling the zero backlash characteristic was satisfactory, however the requirement of two sets of disks for both angular and parallel misalignment lead to higher inertia. While other flexible couplings may be satisfactory for bag making applications, the present flexible coupling has been found to be particularly suitable for such application.

SUMMARY OF THE INVENTION

In accordance with the present invention there is provided a flexible coupling for coupling a drive shaft with a driven shaft including a flexible central disk means which through flex provides for angular misalignment and a plurality of supporting side leaf spring means which provides for parallel misalignment. The coupling includes a drive plate and a driven plate and a first pair of lugs connected to the opposite sides of the drive plate and a second pair of lugs connected to the opposite sides of the driven plate. The flexible coupling further includes means including a pair of the side leaf spring means for connecting the first pair of lugs to opposite sides of the flexible central disk means and means including another pair of the side leaf spring means for connecting the second pair of lugs to opposite sides of the flexible central disk means. A first coupling hub is connected to the drive plate for coupling the drive plate to the drive shaft and a second coupling hub is connected to the driven plate for coupling the driven plate to the driven shaft. The hubs preferably are split so that they can be clamped onto the input and output shafts which is an important feature for alternating torque loads.

It is another object of the invention to provide a flexible coupling which is constructed for ease in assembly and disassembly without disturbing the index drive and for easy replacement of the flexible elements. It is a further object of the invention to provide a flexible coupling which provides for input/output shaft alignment during coupling installation.

The foregoing and other objects, features and advantages of the invention will be better understood from the following, more detailed description and appended claims.

SHORT DESCRIPTION OF THE DRAWINGS

DESCRIPTION OF THE SPECIFIC EMBODIMENT

Figure 1:
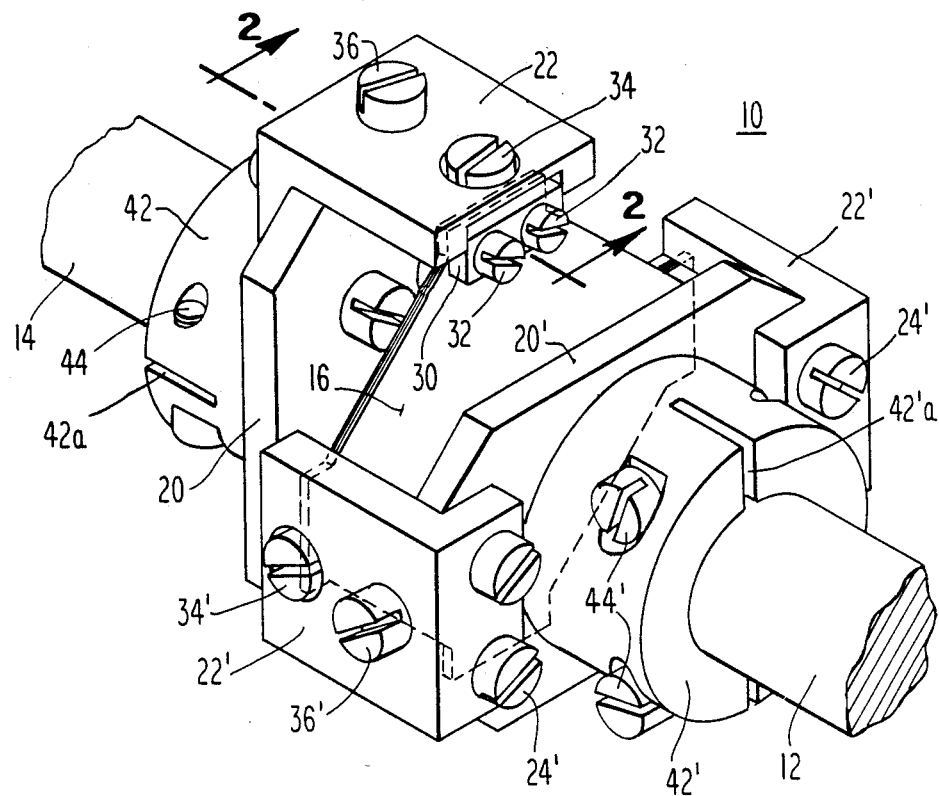
FIG. 1 is a perspective view of a flexible coupling embodying the present invention.

Referring to FIGS. 1–5 it will be seen that there is illustrated a specific embodiment of a flexible coupling 10 in accordance with the present invention. The flexible coupling is adapted to couple an input or drive shaft 12 with an output or driven shaft 14. While the invention has been described above, where the flexible coupling is adapted for use in a bag making system, where the flexible coupling couples the output from a drive shaft on an hydraulic index drive with the driven roll on a vacuum table, as disclosed in the foregoing related applications which are incorporated herein by reference thereto, it is to be understood that the flexible coupling of the present invention is suitable for other coupling installations and particularly high speed, high torque applications where low inertia and zero backlash characteristics are desired.

The flexible coupling 10 includes a flexible central disk means 16 which preferably comprises a plurality of flat spring members, three having been illustrated, positioned in layers. As may be seen in FIGS. 4 and 5 the flat central disk 16 is substantially square in shape and the diagonally opposite corners 16a, 16a, and 16b, 16b are shaped for connection to a drive plate 20' and an identical driven plate 20, as hereinafter described. The driven plate 20 has a pair of L-shaped lugs 22 connected to the opposite sides thereof and a similar pair of lugs 22' are connected to the opposite sides of the drive plate 20'. The lugs 22 and 22' are identical in construction as are the various parts identified by a prime connecting these lugs to the flexible central disk 16, as now to be described. This construction is best shown in FIGS. 2 and 5.

Figure 5:
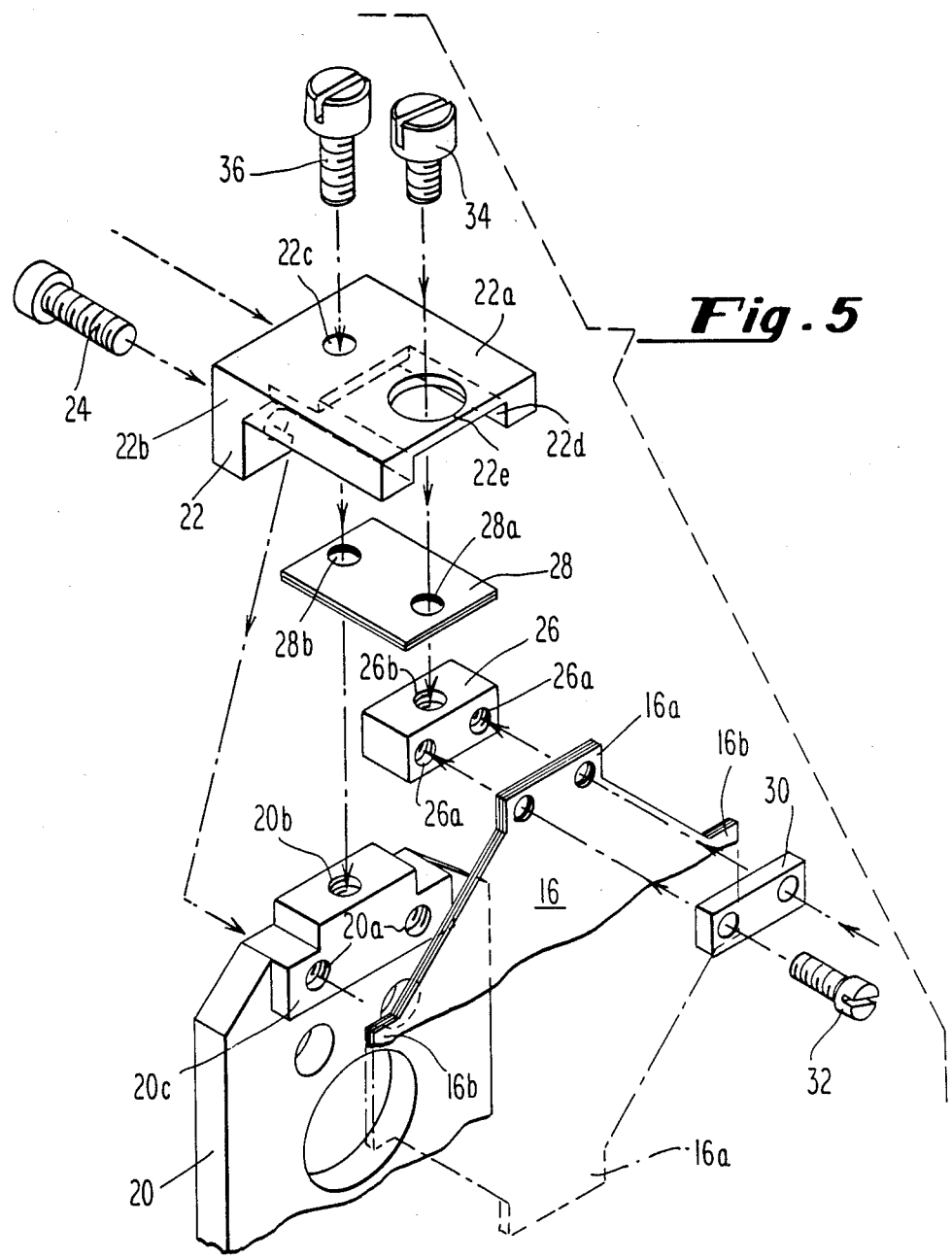
FIG. 5 is an exploded view of a portion of the flexible coupling shown in FIG. 1 and particularly the portion shown in FIG. 2.

It will be seen in FIG. 5 that the L-shaped lug 22 includes a transverse portion 22a and a depending portion 22b. The depending portion 22b is provided with a pair of openings therethrough which are adapted to receive a pair of cap screws 24 for insertion into the threaded openings 20a in the driven plate 20. The transverse portion 22a of the lug 22 is provided with an opening 22c adjacent the depending portion 22b. The lower surface of the transverse portion 22a is provided with a channel 22d extending from a midpoint of the transverse portion 22a to the outer end. The transverse portion 22a is provided with a second opening 22e of larger diameter extending through the upper surface thereof and through the channel 22d. The width of the channel 22d is dimensioned to receive a mounting block 26 and a supporting side leaf spring means 28. The supporting side leaf spring means may comprise one or more leaf springs positioned in layer two flat spring members have been illustrated in the drawings. Each corner 16a, 16b, FIG. 5, of the flexible central disk 16 is shaped for attachment to one of the mounting blocks 26. Each corner 16a is positioned between a mounting plate 30 and the mounting block 26 and screws 32 are inserted through openings in the mounting plate 30 and corresponding openings in the corner 16a of the flexible central disk 16 with the ends of the screws being threaded into the threaded openings 26a in the mounting block 26. The transverse dimensions of the corner 16a and the mounting plate 30 are the same as the mounting block 26 so they will fit within the channel 22d of the lug 22. A cap screw 34 is inserted through the enlarged opening 22e in the lug 22 and through the opening 28a at the outer end of the supporting side leaf spring 28 and is threadedly received in the opening 26b in the mounting block 26. Thus, it will be seen that the screw 34 secures one end of the supporting side leaf spring 28 to the mounting block 26 and the mounting block 26, in turn, is secured to one corner 16a of the flexible central disk 16. The other end of the supporting side leaf spring 28 is secured to the driven plate 20 by a cap screw 36 which extends through the opening 22c in the lug 22 and opening 28b in spring 28 and is threadedly received in the opening 22b in the end of the driven plate 20.

Figure 2:
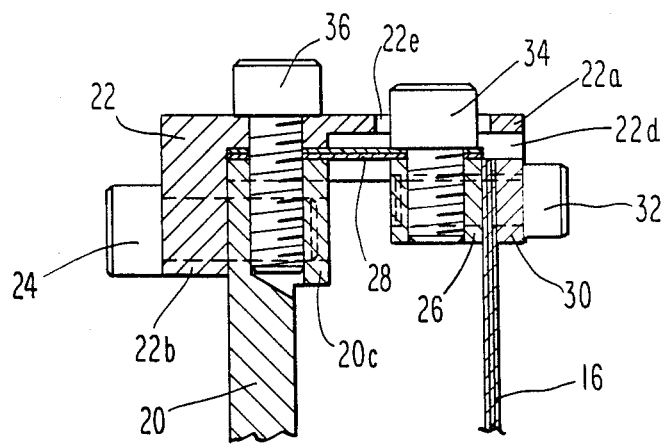
FIG. 2 is a sectional view taken along the lines 2—2 in FIG. 1.

The parts that have been shown in the exploded view of FIG. 5 are shown in assembled position in FIG. 2. It will be noted that the end of the driven plate 20 is provided with a thickened boss 20c to provide additional support for the end of the supporting side leaf spring 28 and for anchoring the screws 24 and 36 which secure the lug 22 to the driven plate 20.

Figure 3:
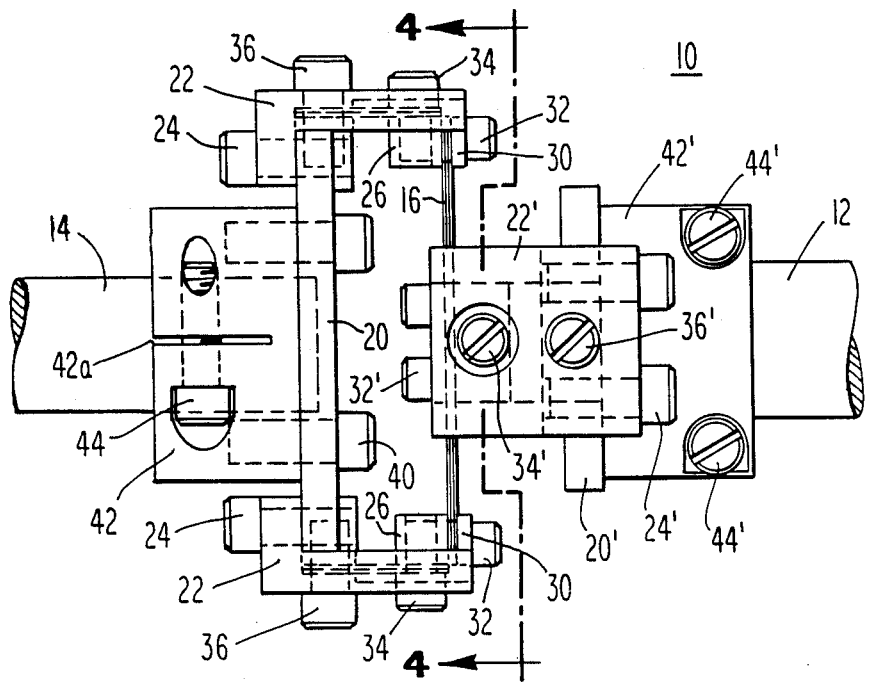
FIG. 3 is a side elevational view of the flexible coupling shown in FIG. 1.
Figure 4:
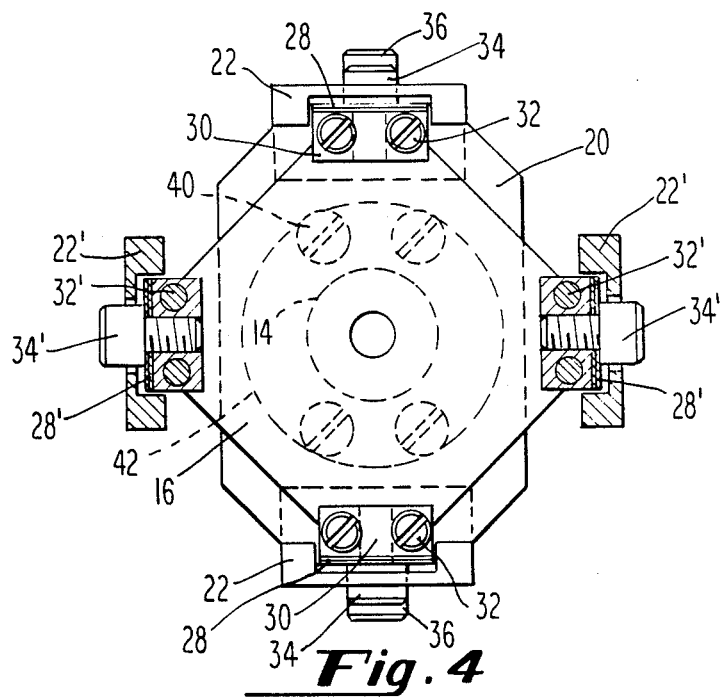
FIG. 4 is a sectional view taken along the lines 4—4 in FIG. 3.

As may be seen in FIGS. 1, 3 and 4, each of the plates 20 and 20' is connected by a plurality of screws 40, (the screws for plate 20' are not shown) to a coupling hub 42, 42' which in turn are respectively connected to the driven shaft 14 and the drive shaft 12. The coupling hubs 42 and 42' are of identical construction and thus the same reference characters with the addition of a prime have been applied to each. Each of the coupling hubs 42, 42' is of split construction and have slits 42a, 42'a in one end thereof for clamping the hubs on the shafts. The hubs 42, 42' have threaded openings extending through the split ends of the hubs which are adapted to receive clamp screws 44, 44'. In one embodiment of the invention the flexible coupling had a size of approximately 3"×4.5", a weight of approximately 2.8 lbs. and an inertia of 2.9 lb.in.sq. The flexible central disk 16 was made of three layers of spring steel hardened and tempered and having a layer thickness of 0.015". The supporting side leaf springs were also made of spring steel hardened and tempered with two layers of springs each having a thickness of 0.015". The lugs 22, 22' and the mounting blocks 26, 26' and mounting plates 30, 30' were all made of bronze. The plates 20 and 20' and the coupling hubs 42 and 42' were made of steel. From the foregoing description it will be seen that the construction of the flexible coupling provides for ease in assembly and disassembly and for clamping the hubs on the respective shafts as well as for easier replacement of the flexible elements.

While there has been described a preferred embodiment of the invention, it will be understood that further modifications may be made without departing from the spirit and scope of the invention as set forth in the appended claims.

What is claimed is:

1. A flexible coupling for coupling a drive shaft with a driven shaft comprising:
    a flexible central disk which provides for angular misalignment,
    a plurality of supporting side leaf spring means which provide for parallel misalignment, each of said leaf spring means having first and second ends,
    a drive plate,
    a driven plate,
    a first pair of L-shaped lugs connected to opposite sides of said drive plate and to said first ends of a first pair of said side leaf spring means,
    a second pair of L-shaped lugs connected to opposite sides of said driven plate and to said first ends of a second pair of said side leaf spring means,
    means separate from and operatively connected with said first pair of L-shaped lugs for connecting said second ends of said first pair of said side leaf spring means to opposite sides of said flexible central disk,
    means separate from and operatively connected with said second pair of L-shaped lugs for connecting said second ends of said second pair of said side leaf spring means to opposite sides of said flexible central disk,
    a first coupling hub connected to said drive plate for coupling said drive plate to the drive shaft, and
    a second coupling hub connected to said driven plate for coupling said driven plate to the driven shaft.

2. A flexible coupling according to claim 1 wherein said flexible central disk comprises a plurality of flat spring members positioned in layers.

3. A flexible coupling according to claim 1 wherein said flexible disk is of a shape having diagonally opposite corners operatively connected to said drive plate and said driven plate.

4. A flexible coupling according to claim 1 wherein said first and second coupling hubs are of split construction for clamping on the respective shafts.

5. A flexible coupling according to claim 1 wherein each of said supporting side leaf spring means comprises a plurality of flat spring members positioned in layers.

6. A flexible coupling for coupling a drive shaft with a driven shaft comprising:
    a flexible central disk which provides for angular misalignment,
    a plurality of supporting side leaf spring means which provide for parallel misalignment,
    a drive plate,
    a driven plate,
    a first pair of lugs connected to opposite sides of said drive plate,
    a second pair of lugs connected to opposite sides of said driven plate,
    means including a pair of said side leaf spring means for connecting said first pair of lugs to opposite sides of said flexible central disk, means including another pair of said leaf spring means for connecting said second pair of lugs to opposite sides of said flexible central disk, a first coupling hub connected to said drive plate for coupling said drive plate to the drive shaft, and a second coupling hub connected to said driven plate for coupling said driven plate to the driven shaft, wherein each of said lugs is of substantially L-shaped configuration including a transverse portion and a depending portion, said depending portion being adapted to be secured to one of said plates, said transverse portion having a first opening therethrough adjacent said depending portion, said transverse portion having a lower surface having a channel therein extending from a midpoint to the outer end of said transverse portion, said transverse portion having a second opening extending through the upper surface of said transverse portion and through said channel, and said means for connecting each of said lugs to the opposite sides of said flexible disk comprises threaded means extending through said first opening in said transverse portion of said lug and through one end of one of said side leaf spring means for securing said side leaf spring means to the end of one of said plates, a block secured to one side of said flexible central disk, said block being dimensioned to fit within said channel in said transverse portion of said lug, and means extending through said second opening in said transverse portion of said lug for securing the opposite end of said side leaf spring means to said block.

* * * * *